United States Patent [19]
Takayama et al.

[11] Patent Number: 4,851,922
[45] Date of Patent: Jul. 25, 1989

[54] VIDEO SIGNAL PROCESSING APPARATUS

[75] Inventors: Makoto Takayama, Kawasaki; Masahiro Takei, Yokohama, both of Japan

[73] Assignee: Canon Kabushiki Kaisha, Tokyo, Japan

[21] Appl. No.: 704,933

[22] Filed: Feb. 25, 1985

[30] Foreign Application Priority Data

Feb. 29, 1984 [JP] Japan ................................. 59-36119
Feb. 29, 1984 [JP] Japan ................................. 59-36120

[51] Int. Cl.⁴ .............................................. H04N 1/04
[52] U.S. Cl. ....................................... 358/451; 358/77
[58] Field of Search .......................... 358/287, 138, 77

[56] References Cited

U.S. PATENT DOCUMENTS 4,521,812  6/1985  Knop ................................. 358/287
4,587,621  5/1986  Duvall ............................... 358/287

Primary Examiner—Edward L. Coles, Sr.
Attorney, Agent, or Firm—Fitzpatrick, Cella, Harper and Scinto

[57] ABSTRACT

A video signal processing apparatus comprising: an oscillator for generating a frequency signal for sampling a video signal, the oscillator permitting its oscillating frequency to be varied; a sampler for sampling the video signal by the frequency signal; and an instructing circuit for instructing a charge in the number of samples in one frame taken by the sampler, wherein the oscillator changes the oscillating frequency in accordance with the instruction.

30 Claims, 5 Drawing Sheets

FIG. 6
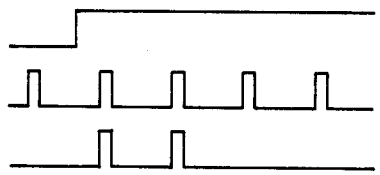
- 18 A/D START SIG.
- 14 VERTICAL SYNCHRONIZING SIG. VD
- 19 AND OUTPUT
FIG. 7
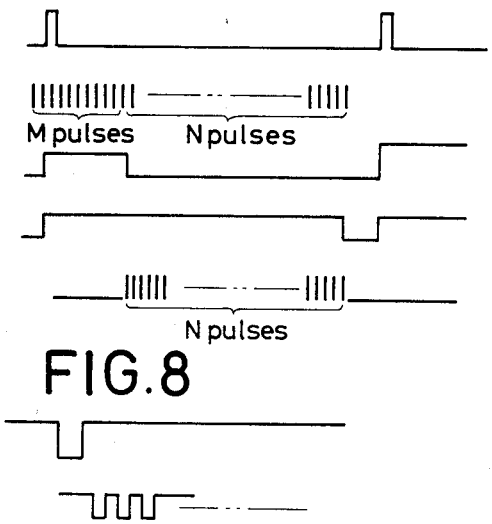
- 19 AND OUTPUT
- 20 HORIZONTAL SYNCHRONIZING SIG. HD (M pulses, N pulses)
- 23 OUTPUT
- 27 OUTPUT
- 25 AND OUTPUT (N pulses)
FIG. 8
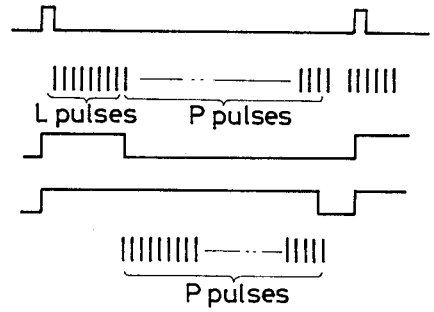
- 28 OUTPUT
- 31 OR OUTPUT
FIG. 9
- 25 AND OUTPUT
- 31 OR OUTPUT (L pulses, P pulses)
- 37 OUTPUT
- 41 OUTPUT
- 39 AND OUTPUT (SAMP. PULSE 42) (P pulses)

VIDEO SIGNAL PROCESSING APPARATUS

BACKGROUND OF THE INVENTION

1. Field of the Invention

The present invention relates to a video signal processing apparatus for processing a video signal to obtain a print image from the video signal.

2. Description of the Prior Art

FIG. 1 shows a block diagram of an example of an arrangement of a conventional video printer for processing a video image. An input video signal 1 is converted to a digital signal by an A/D converter 2 and is processed to become a printing signal by an image processing circuit 3 and is printed by a printer 4.

Next, the case where a print size is switched using this apparatus will be assured. FIG. 2 shows a situation wherein the number of sample points of the image data is doubled as compared with the original image and the print size is doubled (i.e., the area covered is increased four times) and an arrangement block diagram of a video printer suitable for use in this case is shown in FIG. 3. In FIG. 3, the similar (corresponding) components as those shown in FIG. 1 are designated by the same reference numerals. The input video signal 1 is converted to a digital signal by the A/D converter 2 and an interpolation of the data is performed by an interpolating circuit 10. The interpolated data is processed by the image processing circuit 3 to become the printing signal and is printed by the printer 4. The interpolating circuit 10 converts image data 5 and 6 in FIG. 2 to image data 7, 8 and 9, respectively. It is assumed that the image data 7 is the same as the image data 5 and the image data 9 is the identical to the image data 6, while the intermediate image data 8 is the data which is inserted between the image data 5 and 6. In the case of a linear interpolation, the image data 5 and 6 are added and the quotient of the sum was divided by two is used as the image data 8. The interpolation is performed in the foregoing arrangement and the print size of the image is changed over.

However, such an interpolation requires memories, adders and dividers since additions and divisions of at least two pixels are executed in both horizontal and vertical directions of the picture plane, so that there are the drawbacks that the hardware becomes complicated and expensive and that the timings for data processes also become complicated.

SUMMARY OF THE INVENTION

It is an object of the present invention to eliminate the above-mentioned drawbacks of the conventional technology.

It is another object of the invention to provide a video signal processing apparatus which enables the sampling number to be changed with a simple arrangement.

Still another object of the invention is to provide a video signal recording apparatus which can change a print size with a simple arrangement. According to the present invention, these objects are attained by providing a video signal processing apparatus having an oscillator or the like with a variable-frequency output, circuitry for sampling a video signal by means of the oscillating signal, and means for instructing a change in the number of samples taken per frame. The oscillator changes its output frequency in accordance with the instruction. This may be done, for example, by means of a delay line. The sampling interval may be changed in either a horizontal scanning direction, or a direction perpendicular thereto, at the least. The size of a recorded image may be changed in association with the change in number of samples.

Other objects and features of the present invention will be apparent from the following detailed description of the preferred embodiments taken in conjunction with the accompanying drawings.

BRIEF DESCRIPTION OF THE DRAWINGS

FIGS. 6 to 9 are timing charts for each of the illustrated signals, respectively;

DETAILED DESCRIPTION OF THE PREFERRED EMBODIMENTS

Figure 1:
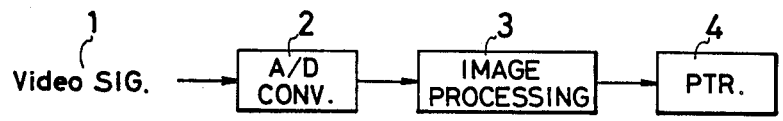
FIG. 1 is a block diagram of an example of an arrangement of a conventional video printer.
Figure 2:
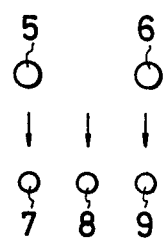
FIG. 2 is an explanatory diagram of a case in which the number of sample points of an image data is doubled.
Figure 3:
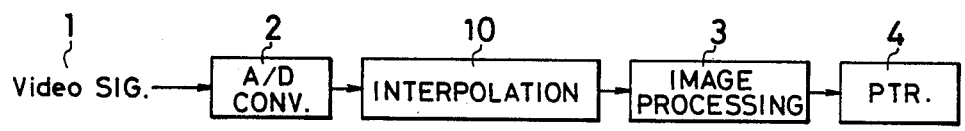
FIG. 3 is a block diagram of an arrangement of a video printer suitable for use in in such a case.
Figure 4:
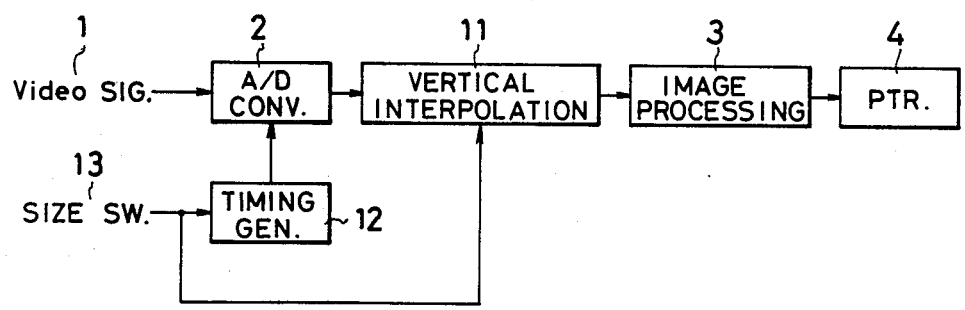
FIG. 4 is an arrangement block diagram of one embodiment of a video printer of the invention.

The present invention will now be described hereinbelow with reference to the drawings. FIG. 4 is a block diagram showing an arrangement of one preferred embodiment of the invention, in which the components similar (corresponding) to those shown in FIGS. 1 and 3 are designated by the same reference numerals. The input video signal 1 is converted to the digital signal by the A/D converter 2 and is inputted to a vertical interpolator 11. In the vertical interpolator 11, the presence or absence of vertical interpolation is selected by means of control of a size switching signal 13. The vertical interpolator 11 operates in a manner such that it does not perform interpolation when the print size is small but does interpolate when the print size is large. An output of the vertical interpolator 11 is processed by the image processing circuit 3 to become a printing signal and is printed by the printer 4.

The size switching signal 13 controls a timing generator 12 in a manner such that the sampling number in the horizontal direction decreases in the case of a small print size and increases in the case of a large print size. A sampling timing of the image of the A/D converter 2 is controlled in response to an output of the timing generator 12.

As described above, in case of an ordinary print size, the sampling number in the horizontal direction of the image is few relatively small, and no vertical interpolation is performed. When the print size is large, the horizontal sampling number of the image increases in accordance with the print size and the vertical interpolation is also carried out. Thus, the print size can be switched by the print size switching signal 13.

Figure 5:
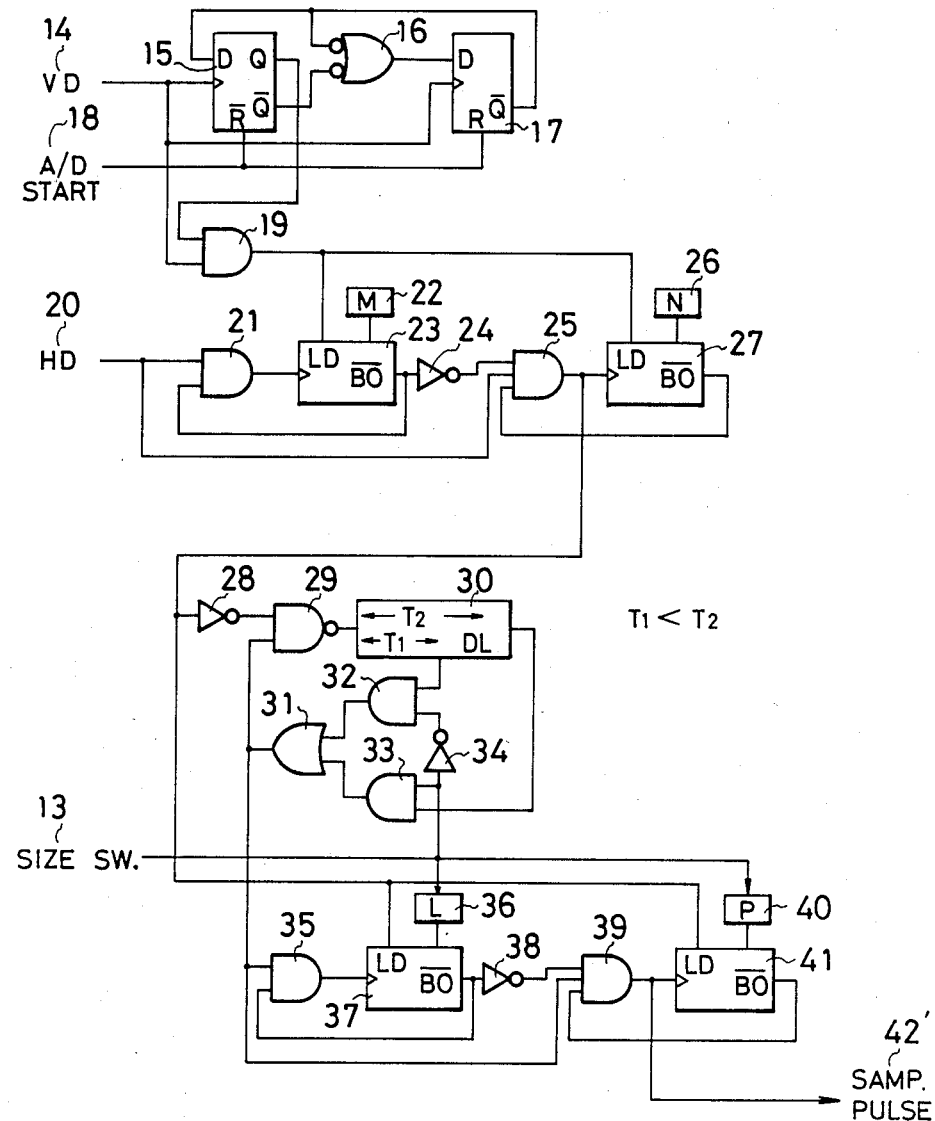
FIG. 5 is a circuit arrangement diagram of a timing generator.

FIG. 5 shows an example of a circuit arrangement of the timing generator 12. This diagram shows an embodiment suitable for use in the case where the sampling is performed in the horizontal direction, in which a reference numeral 14 denotes a vertical sync signal VD synchronized with the video signal; 18 is a start signal for the A/D conversion; 15 and 17 are D-FF (D type flip-flop) circuits, respectively; 16 and NAND circuit (gate); and 19 an AND gate. As shown in a timing chart for each signals in FIG. 6, the two vertical sync signal 14 (VD) are outputted from the AND gate 19 due to each of those circuits after the leading edge of the A/D conversion start signal 18. Due to this, one frame of a TV signal to perform the interlace is fetched from the A/D conversion signal synchronously with the vertical sync signal.

A numeral 20 is a horizontal sync signal HD synchronized with the video signal; 21 and 25 are AND gates, respectively; 22 a preset circuit to preset M preset values; 23 and 27 presettable down counters; 24 an inverter; and 26 a preset circuit to preset N preset values.

As shown in a timing chart for each signal in FIG. 7, the presettable counter 23 counts M horizontal sync signals HD and sets this count value to the number equal to the vertical blanking. The presettable counter 27 counts N horizontal sync signals HD and sets this count value as the sampling number of the image in the vertical direction. Therefore, with the arrangement of the respective circuits 21 to 27, N horizontal sync signals, as many as the number of samples of the image in the vertical direction, are obtained from the AND gate 25.

In addition, numerals 28 and 34 are inverters, 20 respectively; 29 a NAND circuit; 30 a tapped delay line DL; 31 an OR circuit; and 32 and 33 AND circuits. With this arrangement, as shown in a timing chart for each signal in FIG. 8, an oscillating output synchronized with an output signal of the inverter 28 is derived from the OR gate 31. Namely, a gated oscillator is constituted by the NAND gate 29 and delay line 30. The oscillating frequency is selected by selecting a tap output of the tapped delay line 30 by the size switching signal 13. Namely, in the case of an ordinary print size, the oscillating frequency is made low by selecting a tap $T_2$. In the case of a large print size, the oscillating frequency is made high by selecting a tap $T_1$.

Further, numerals 35 and 39 and AND circuits, respectively; 36 a preset circuit to set a preset value L; 37 and 41 presettable down counters, respectively; 38 an inverter; and 40 a preset circuit to set a preset value P. The presettable down counter 37 counts the preset value L. This means that the horizontal blanking time is set from the horizontal sync signal HD and the oscillating frequency varies in dependence upon the print size; therefore, by changing a value of the preset value L of the preset circuit 36, the horizontal blanking time is made constant. On the other hand, the presettable down counter 41 counts the preset value P, thereby setting the sampling number in the horizontal direction. A timing chart for each of those signals is shown in FIG. 9. Namely, by changing the preset value P in association with a change-over of the print size, the sampling number in the horizontal direction is determined.

As described above, when the A/D conversion start signal 18 is inputted, a control signal pulse 42 for sampling the input video signal 1 in the horizontal direction can be generated for the interval excluding the vertical and horizontal blanking intervals during one frame synchronized with the vertical sync signal VD after the input of the start signal 18. Also, by use of the print size switching signal 13, the horizontal sampling number can be changed and the same horizontal video signal can be sampled.

On the other hand, to increase the print size X times, the oscillating frequency may be increased X times and the present values L and P of the counters 37 and 41 in the horizontal direction may be increased X times. (Another Embodiment)

Figure 10:
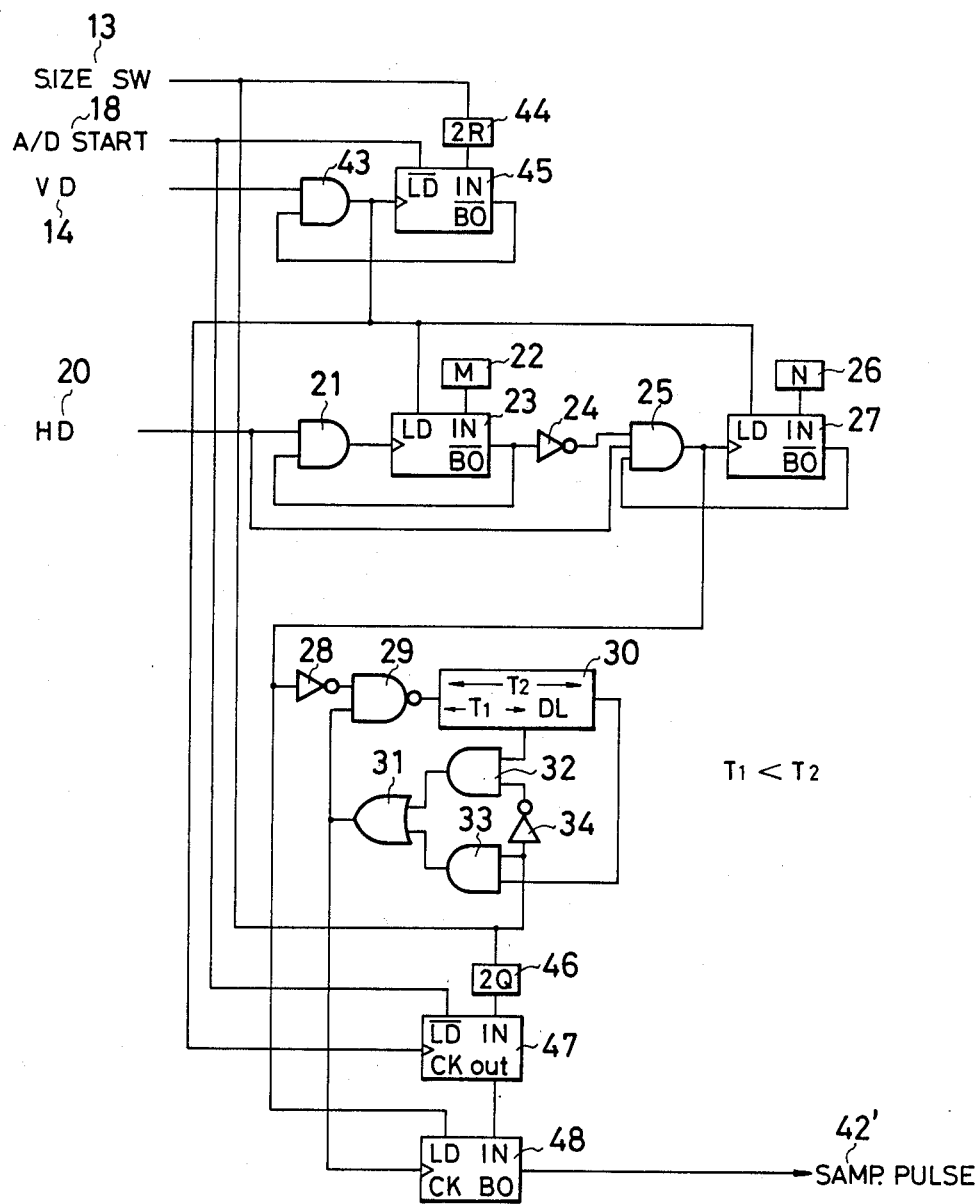
FIG. 10 is an example of another circuit arrangement of the timing generator.

FIG. 10 shows an embodiment of another circuit arrangement of the timing generator 12, in which the components similar (corresponding) to those shown in FIG. 5 are designated by the same reference numerals and their descriptions are omitted.

This embodiment shows the case where the video signal is vertically sampled, in which a numeral 43 denotes an AND circuit; 44 is a preset circuit to set a preset value 2R; and 45 is a presettable down counter.

Figure 11:
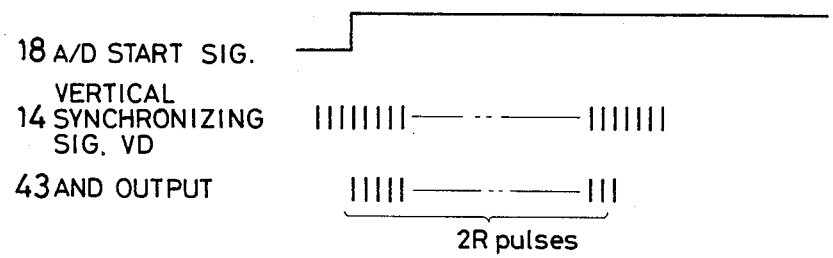
FIGS. 11 and 12 are timing charts for each of the illustrated signals for the FIG. 10 arrangement, respectively.

In the respective circuits 43 to 45, as shown in a timing chart for each signal in FIG. 11, the preset value 2R is counted by the presettable down counter 45 and 2R vertical sync signals are derived from the AND gate 43. The meaning of the number 2R of this preset value represents that assuming that the sampling number in the horizontal direction is R, two fields have to be sampled in order to sample one frame of the television signal and the data for one vertical line can be sampled for two vertical intervals. Therefore, the vertical interval which is twice the interval in the case of R is needed to sample R points in the horizontal direction. A change in print size denotes a change of sample points in the horizontal direction, so that such a change can be performed by changing the preset value 44.

Next, in the circuit arrangement from the AND gate 21 to the presettable counter 27, the vertical sampling is determined similarly to the case of the horizontal sampling in FIG. 5.

In addition, the circuit arrangement from the inverter 28 to the OR circuit 31 also constitutes an oscillator synchronized with the phase of the horizontal sync signal similarly to the case of the horizontal sampling in FIG. 5. A numeral 46 denotes a preset circuit to set a preset value 2Q; 47 is a presettable up counter; and 48 is a presettable down counter. The presettable up counter 47 counts the vertical sync signal and its output is used as a preset value of the presettable down counter 48.

Figure 12:
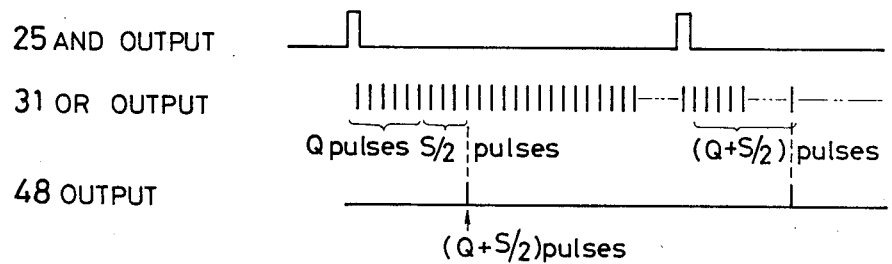

The presettable down counter 48 counts down an oscillating output of an output of the OR gate 31 from the preset value and when the count value becomes 0, the down counter 48 outputs a sampling pulse 42'. As described above, the data for one line can be sampled due to two fields with respect to the vertical sampling; therefore, ½ of an output of the presettable up counter 47, namely, a value of which the LBS (least significant bit) was eliminated is used as a preset value of the presettable down counter 48. Also, the preset circuit 46 of the presettable up counter 47 sets the preset value of 2Q, which is twice the number Q. A timing chart for each of those signals is shown in FIG. 12.

Assuming that the number of vertical sync signals after the A/D start signal 18 was inputted is S, the sampling pulse 42' is generated when $(Q+S/2)$ oscillating outputs of the output of the OR gate 31 are counted after the horizontal sync signal from the AND gate 25 has been inputted, in which the number S has a value within a range of $Q \leq S < R$.

As described above, the vertical sampling can be likewise performed by changing the horizontal sampling number by means of control of the print size.

As described in the above with respect to each embodiment, according to the present invention, in an image processing apparatus for printing a video signal, in the case of switching a print size, the data in the vertical direction is increased by means of interpolation; however, the data in the horizontal direction is increased by increasing the number of sampling points. Therefore, memories, adders, dividers, etc., in association with the horizontal interpolation as in a conventional apparatus becomes unnecessary, so that the system arrangement can be simplified and an increase in cost of the hardware can be avoided.

On the other hand, in the case where the print size is switched, the start point of the horizontal samples and the sampling number can be preset; consequently, even if the print size is changed, the range of data where the video signal can be taken in can be made constant.

The present invention is not limited to the foregoing embodiments but many modifications and variations are possible within the spirit and scope of the invention as set out in the appended claims.

What we claim is:

1. An analog video signal processing apparatus comprising:
    means for generating a frequency signal for sampling an analog video signal, said generating means enabling an oscillating frequency to be varied;
    A/D converting means for sampling and converting the analog video signal into a digital system in synchronism with the frequency signal; and
    instructing means for instructing a change in a number of samples to be taken in one frame by said A/D converting means, wherein
    said generating means changes the oscillating frequency in accordance with an instruction by said instructing means, and
    wherein said generating means has a delay line and changes the oscillating frequency by changing a delay time of said delay line.

2. An analog video signal processing apparatus according to claim 1, wherein said A/D converting means performs the sampling along a horizontal scanning line of the analog video signal.

3. An analog video signal processing apparatus according to claim 1, wherein said A/D converting means performs the sampling in a direction that is substantially vertical to a horizontal scanning line of the analog video signal.

4. An analog video signal processing apparatus according to claim 1, wherein said A/D converting means varies a sampling interval in the direction of the horizontal scanning line of the analog video signal by changing the oscillating frequency.

5. An analog video signal processing apparatus according to claim 1, further comprising recording means for performing a recording in accordance with a sample output of said A/D converting means.

6. An analog video signal processing apparatus according to claim 5, wherein said recording means changes a size of a recording image in association with a change in the number of samples.

7. A video signal processing apparatus comprising:
    means for generating pulse signals for sampling an analog video signal including a horizontal blanking interval and a horizontal sync signal;
    A/D converting means for sampling and converting the analog video signal into a digital signal in synchronism with the pulse signals;
    instructing means for instructing a change in a number of samples in one frame by said A/D converting means; and
    control means for changing a frequency of the pulse signals in response to an instruction by said instructing means, wherein said control means keeps constant the number of the pulse signals for the horizontal blanking interval regardless of said instruction and changes the number of pulse signals for said one horizontal scanning line in response to said instruction.

8. A video signal processing apparatus according to claim 7, wherein said control means has a first counter for counting the pulse signals for an interval from the horizontal sync signal until the sampling is started and a second counter for counting the pulse signals for sampling one horizontal scanning line.

9. A video signal processing apparatus according to claim 7, wherein said generating means is constituted by one oscillator.

10. A video signal processing apparatus according to claim 9, wherein said oscillator has a delay line and changes the oscillating frequency by changing a delay time of said delay line.

11. A video signal processing apparatus according to claim 7, wherein said A/D converting means performs the sampling along the horizontal scanning line of the video signal.

12. A video signal processing apparatus according to claim 7, wherein said A/D converting means performs the sampling in a direction that is substantially vertical to the horizontal scanning line of the analog video signal.

13. A video signal processing apparatus according to claim 7, further comprising recording means for performing a recording in accordance with a sample output of said A/D converting means.

14. A video signal processing apparatus according to claim 13, wherein said recording means changes a size of a recording image in association with a change in the number of samples.

15. An image signal processing apparatus comprising:
    (a) A/D converting means for converting an analog image signal, which includes a blanking period, into a digital image signal;
    (b) means for indicating a multiplication of said image signal;
    (c) means responsive to an indicated multiplication for performing multiplication processing on the digital image signal; and
    (d) means for controlling the multiplication processing so that the multiplication processing is suppressed on a specified period of the image signal.

16. An image signal processing apparatus according to claim 15, wherein the specified period of the image signal is the blanking interval of the image signal.

17. An image signal processing apparatus according to claim 15, wherein said multiplication processing means performs the processing by varying and A/D conversion timing of said A/D converting means.

18. An image signal processing apparatus according to claim 17, wherein said multiplication processing means includes means for generating a frequency signal for sampling the image signal, said generating means enabling an oscillating frequency of the frequency signal to be varied.

19. An image signal processing apparatus according to claim 18, wherein said generating means has a delay line and changes the oscillating frequency by changing a delay time of said delay line.

20. An image signal processing apparatus according to claim 17, wherein said A/D converting means performs the sampling along a horizontal scanning line of the analog video signal.

21. An image signal processing apparatus according to claim 17, wherein said A/D converting means performs the sampling in a direction that is substantially vertical to a horizontal scanning line of the analog video signal.

22. An image signal processing apparatus according to claim 17, where said A/D converting means varies a sampling interval in a direction of a horizontal scanning line of the analog video signal by changing the oscillating frequency.

23. An image signal processing apparatus according to claim 15, further comprising recording means for performing a recording in accordance with the digital image signal output by said A/D converting means.

24. An image processing apparatus according to claim 23, wherein said recording means records the multiplication-processed signal.

25. An image processing apparatus comprising:
  first processing means for executing enlargement/reduction processing, to enlarge/reduce in a first direction an image represented by a given image signal, by changing a sampling timing of the given image signal;
  directing means for directing said first processing means to execute enlargement/reduction processing of the given image signal;
  second processing means for executing enlargement/reduction processing to enlarge/reduce the image in a second direction different from said first direction, by executing an interpolation of the given image signal; and
  control means for combining said enlargement/reduction processing of said first processing means with said enlargement/reduction processing of said second processing means, in response to a direction by said directing means.

26. An apparatus according to claim 25, wherein said first processing means executes enlargement/reduction processing in a horizontal direction of the image as said first direction.

27. An apparatus according to claim 25, wherein said second processing means executes enlargement/reduction processing in a vertical direction of the image as said second direction.

28. An apparatus according to claim 25, wherein the given image signal is an analog image signal.

29. An apparatus according to claim 28, wherein said first processing means samples the analog image signal for each predetermined sampling timing and converts the analog image signal, after such sampling, into a digital image signal.

30. An apparatus according to claim 25, wherein said control means controls said first and second processing means such that said first processing means executes enlargement/reduction processing in a horizontal direction of the image as said first direction and said second processing means executes enlargement/reduction processing in a vertical direction of the image as said second direction.

* * * * *

UNITED STATES PATENT AND TRADEMARK OFFICE
CERTIFICATE OF CORRECTION

PATENT NO. : 4,851,922

DATED : July 25, 1989

INVENTOR(S) : MAKOTO TAKAYAMA, ET AL.

Page 1 of 2

It is certified that error appears in the above-identified patent and that said Letters Patent is hereby corrected as shown below:

Title page:

IN [56] REFERENCES CITED

Under U.S. PATENT DOCUMENTS, "Duvall" should read --DuVall--.

IN [57] ABSTRACT

Line 6, "charge" should read --change--.

COLUMN 1

Line 17, "assured." should read --assumed.--.
Line 34, "the identical" should read --identical--.
Line 38, "was" should read --which was--.
Line 60, "arrangement. According" should read --arrangement. ¶ According--.

COLUMN 2

Line 18, "in in" should read --in--.
Line 29, "tively;" should read --tively.--.
Line 60, "few" should be deleted.

COLUMN 3

Line 7, "signals" should read --signal-- and "signal" should read --signals--.
Line 30, "20" should be deleted.
Line 44, "and" (second occurrence) should read --are--.

UNITED STATES PATENT AND TRADEMARK OFFICE
CERTIFICATE OF CORRECTION

PATENT NO. : 4,851,922
DATED : July 25, 1989
INVENTOR(S) : MAKOTO TAKAYAMA, ET AL.

It is certified that error appears in the above-identified patent and that said Letters Patent is hereby corrected as shown below:

COLUMN 4

Line 5, "present" should read --preset--.
    Line 6, "(An-" should be deleted.
    Line 7, "other Embodiment)" should read --(Another Embodiment)--.

COLUMN 5

Line 10, "becomes" should read --become--.
    Line 29, "digital system" should read --digital signal--.

COLUMN 6

Line 59, "and" should read --an--.

Signed and Sealed this

Twenty-sixth Day of June, 1990

Attest:

HARRY F. MANBECK, JR.

*Attesting Officer*      *Commissioner of Patents and Trademarks*